(12) United States Patent
Buzzard et al.

(10) Patent No.: US 10,804,060 B2
(45) Date of Patent: Oct. 13, 2020

(54) ROTARY RELAY CONTACTOR

(71) Applicant: Hamilton Sundstrand Corporation, Charlotte, NC (US)

(72) Inventors: John N. Buzzard, Rockford, IL (US); Francis C. Belisle, Roscoe, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/355,203

(22) Filed: Mar. 15, 2019

(65) Prior Publication Data
US 2020/0294748 A1    Sep. 17, 2020

(51) Int. Cl.
| F01C 17/04 | (2006.01) |
| H01H 50/32 | (2006.01) |
| H01H 50/64 | (2006.01) |
| H01H 50/00 | (2006.01) |
| H01H 50/34 | (2006.01) |
| H01H 50/20 | (2006.01) |
| H01H 50/36 | (2006.01) |

(Continued)

(52) U.S. Cl.
CPC ........... *H01H 50/643* (2013.01); *B64D 35/00* (2013.01); *F01C 17/04* (2013.01); *H01H 50/002* (2013.01); *H01H 50/20* (2013.01); *H01H 50/24* (2013.01); *H01H 50/34* (2013.01); *H01H 50/36* (2013.01); *B64D 2221/00* (2013.01)

(58) Field of Classification Search
None
See application file for complete search history.

(56) References Cited

U.S. PATENT DOCUMENTS

| 3,579,264 A | * | 5/1971 | Mork | H01H 43/125 |
| | | | | 219/486 |
| 3,739,113 A | * | 6/1973 | Gruenwald | H01H 43/16 |
| | | | | 200/38 R |

(Continued)

FOREIGN PATENT DOCUMENTS

| CH | 247549 A | 3/1947 |
| DE | 938468 C | 2/1956 |
| FR | 1105573 A | 12/1955 |

OTHER PUBLICATIONS

European Search Report for Application No. 19213214.0, dated Aug. 4, 2020, 33 pages.

*Primary Examiner* — Courtney L Smith
(74) *Attorney, Agent, or Firm* — Cantor Colburn LLP

(57) ABSTRACT

A contactor with a rotary actuation system, the contactor including a plurality of switching devices configured to switch a plurality of electrical circuits, a plurality of cam followers each operably coupled to one of the switching devices, wherein each cam follower is configured to actuate a switching device, and a cam mechanism, the cam pivotally attached to a point rotation, the cam having plurality of lobes about its perimeter, the cam in operable communication with each cam follower such that upon rotation of the cam mechanism, each cam follower engages a lobe of the plurality of lobes, it causes each cam follower to actuate the respective switching device. The contactor also includes an actuator connected to the cam, the actuator responsive to a control current and operable to rotate the cam and a controller, the controller operable to supply a control current the actuator.

18 Claims, 3 Drawing Sheets

(51) Int. Cl.
   *B64D 35/00*   (2006.01)
   *H01H 50/24*   (2006.01)

(56) References Cited

U.S. PATENT DOCUMENTS

| | | | | |
|---|---|---|---|---|
| 5,315,202 | A * | 5/1994 | Lasota | F16H 31/008 |
| | | | | 310/20 |
| 6,575,078 | B1 * | 6/2003 | Wright | F01B 1/0603 |
| | | | | 91/491 |
| 7,538,990 | B2 | 5/2009 | Belisle et al. | |
| 8,031,486 | B2 | 10/2011 | Wavering et al. | |
| 8,559,149 | B2 | 10/2013 | Wavering et al. | |
| 2005/0285481 | A1 * | 12/2005 | Miyazawa | H02N 2/103 |
| | | | | 310/328 |
| 2008/0143462 | A1 | 6/2008 | Belisle et al. | |
| 2016/0194959 | A1 * | 7/2016 | Pekrul | F01C 21/0836 |
| | | | | 418/1 |
| 2019/0257221 | A1 * | 8/2019 | Hughes | F01L 13/0005 |

\* cited by examiner

ROTARY RELAY CONTACTOR

BACKGROUND

The present disclosure relates to controllers, and contactors for switching power sources and loads associated with them, in particular, a rotary contactor for control of power circuits and components on an aircraft.

Vehicles, such as aircraft, typically utilize one or more electronic control unit(s) (ECU) and/or Solid State Power Controllers (SSPC), various sensors, and actuators in various control applications to ensure inflight operation, provide for redundancy, and fail-operational capabilities. A primary function performed by controllers is power control and/or distribution. Electrical systems typically include an electrical power source, which powers a corresponding distribution circuit through a controllable power contactor that selectively interlinks a multitude of distribution circuits. Each distribution circuit is powered by its own source through a corresponding power contactor, however, should a source become defective, the distribution circuit can be powered by the source of another distribution circuit through at least one contactor. Distribution systems of this type are often utilized onboard aircraft. In this environment, each distribution circuit generally powers a distribution bus, which then powers a plurality of electrical loads. Each power source is typically either of a generator driven by an engine of the aircraft, an auxiliary power unit, batteries, and the like.

The contactors reside in a power panel assembly on a primary bus bar structure located within an aircraft electronics bay. The primary bus bars interface to the contactors through terminal posts, assuming it is a 3 phase, AC contactor. In addition to the primary power interfaces, a low power signal connection is required for control and sensing functions. Because the contactors are line replaceable modules (LRMs) each contactor must have an individual chassis to support a multitude of electrical components and wiring harnesses which connect the LRM to the power panel assembly. Moreover, the contactors typically include a harness to provide the interfaces for control and signals. During LRM replacement, tooling is required to remove connectors and large tooling is required to remove fasteners on the primary power interfaces. These interfaces also require a controlled re-torquing procedure and calibrated torque wrench during LRM replacement. Although effective, these features result in a relatively complex LRM that reduces reliability and may result in increased maintenance considerations when located within an aircraft environment.

Furthermore, the present standard for physical implementation of relays and contactors, employs a linear actuator with a cylindrical form e.g., linear solenoid, for the motor drive to switch the internal electric contacts. In the present state of the art regarding electromechanical contactors, the motor structure, and housing is a design driver for the size of the contactor. In aircraft power distribution systems, these form factors are large and not readily implemented in quick line replaceable modules. In order to change the form factor of the relay or contactor assembly to flatten the assembly rather than being generally cylindrical, a new actuator system design is necessary.

Accordingly, it is desirable to provide an uncomplicated line replaceable module with a contactor that is configured to fit with the line replaceable module and minimum of wire harness connections in order to reduce maintenance considerations when located within an aircraft environment.

SUMMARY

According to one embodiment described herein is a contactor with a rotary actuation system, the contactor including a plurality of switching devices configured to switch a plurality of electrical circuits, a plurality of cam followers each operably coupled to one of the switching devices, wherein each cam follower is configured to actuate a switching device, and a cam mechanism, the cam pivotally attached to a point rotation, the cam having plurality of lobes about its perimeter, the cam in operable communication with each cam follower such that upon rotation of the cam mechanism, each cam follower engages a lobe of the plurality of lobes, it causes each cam follower to actuate the respective switching device. The contactor also includes an actuator connected to the cam, the actuator responds to a control current and operable to rotate the cam and a controller, the controller operable to supply a control current the actuator.

In addition to one or more of the features described above, or as an alternative, further embodiments of the rotary actuation system may include that the plurality of switching devices includes at least one of a single pole and a multi-pole switch.

In addition to one or more of the features described above, or as an alternative, further embodiments of the rotary actuation system may include that the plurality of switching devices includes at least three switches, each switch configured to switch a phase of three-phase power.

In addition to one or more of the features described above, or as an alternative, further embodiments of the rotary actuation system may include that the cam mechanism is a polygon wherein each vertex forms one lobe of the plurality of lobes.

In addition to one or more of the features described above, or as an alternative, further embodiments of the rotary actuation system may include that the polygon has at least three vertices.

In addition to one or more of the features described above, or as an alternative, further embodiments of the rotary actuation system may include that the polygon is a hexagon.

In addition to one or more of the features described above, or as an alternative, further embodiments of the rotary actuation system may include that a lobe of the plurality of lobes includes a profile configured to cause latching or hysteresis of the rotation of the cam.

In addition to one or more of the features described above, or as an alternative, further embodiments of the rotary actuation system may include that the actuator is configured to rotate the cam mechanism a selected angular displacement.

In addition to one or more of the features described above, or as an alternative, further embodiments of the rotary actuation system may include that the actuator is a rotary actuator.

In addition to one or more of the features described above, or as an alternative, further embodiments of the rotary actuation system may include that the rotary actuator is configured has a ferromagnetic stator assembly and a ferromagnetic rotor assembly, the stator assembly configured as an arcuate (bow shaped) annular segment and the rotor configured as a sector, the rotor fixed to the cam mechanism.

In addition to one or more of the features described above, or as an alternative, further embodiments of the rotary actuation system may include that the stator assembly includes a stator core having at least two stator teeth and a slot therebetween and a stator coil disposed in the slot.

In addition to one or more of the features described above, or as an alternative, further embodiments of the rotary actuation system may include that the at least one of the stator assembly and the rotor assembly includes ferromagnetic materials including, but not limited to steel laminations, sintered magnetic powder material, or solid ferromagnetic material such a steel.

In addition to one or more of the features described above, or as an alternative, further embodiments of the rotary actuation system may include that the actuator is a linear actuator, the linear actuator having a ferromagnetic stator assembly with a control coil and a piston operably connected to the cam mechanism and configured to rotate the cam mechanism when the linear actuator is activated.

In addition to one or more of the features described above, or as an alternative, further embodiments of the rotary actuation system may include that the linear actuator is a solenoid.

In addition to one or more of the features described above, or as an alternative, further embodiments of the rotary actuation system may include a return spring operably connected to at least one of the actuator or the cam mechanism, the return spring operable to return the cam mechanism to a first position corresponding to the plurality of switching devices being inactive.

In addition to one or more of the features described above, or as an alternative, further embodiments of the rotary actuation system may include that the contactor with a rotary actuation system is configured as a modular line replaceable wherein the plurality of switching devices are distributed at radial points about the perimeter of the cam resulting in a flatter form factor than existing linear contactors.

In addition to one or more of the features described above, or as an alternative, further embodiments of the rotary actuation system may include that the contactor with rotary actuation system is configured for a standard rack mount installation.

Also described herein in another embodiment is an aircraft power distribution system including a power source supplying power to a control unit and a load receiving power from the control unit. The power system also including that the control unit includes a circuit board supporting rack mount plug-in connection and a contactor with a rotary actuation system supported by the board, the contactor configured to selectively provide power from the source to the load in response to a control command.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings, in which:

DETAILED DESCRIPTION

Figure 1:
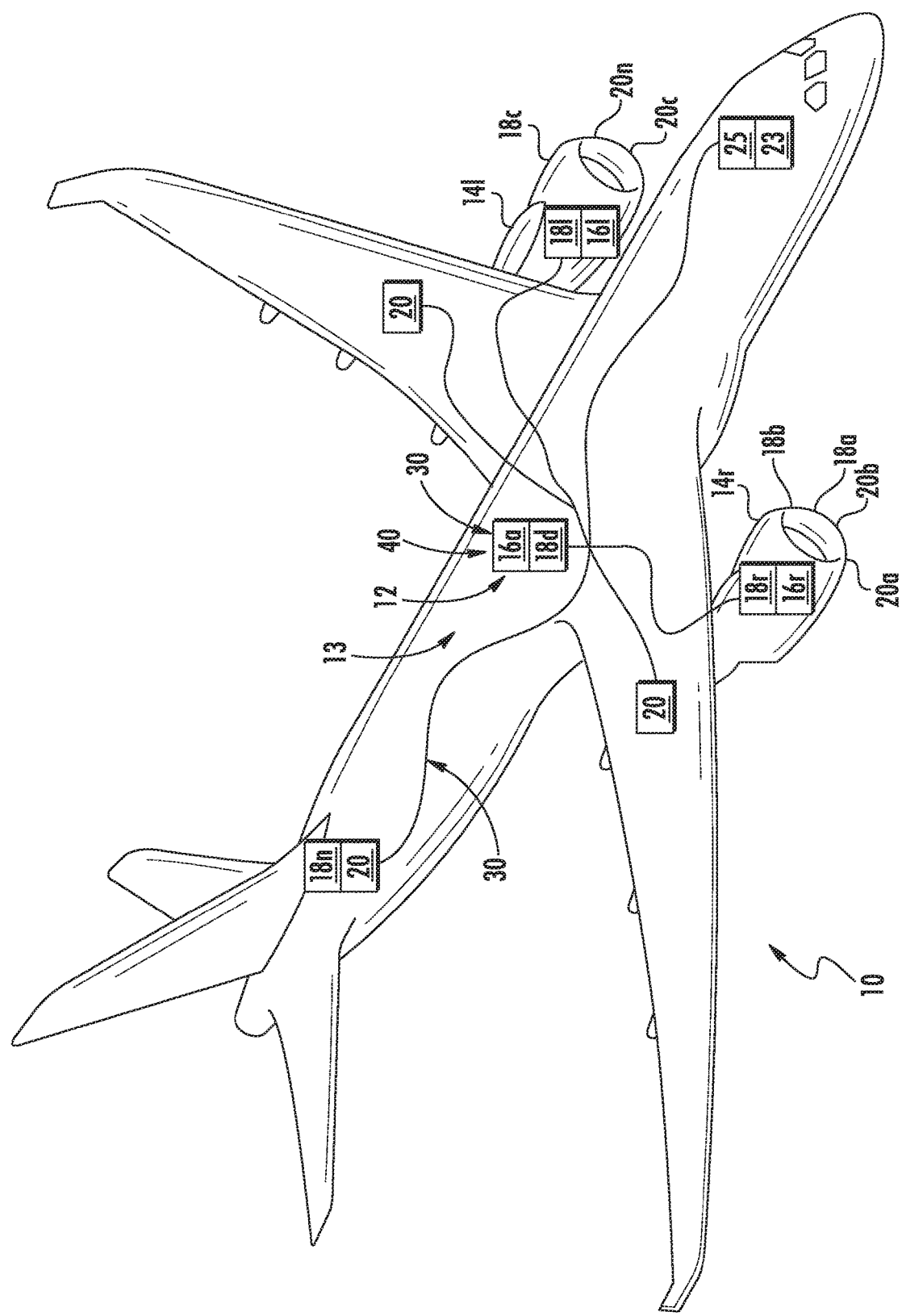
FIG. 1 depicts an example of an aircraft with controller and electrical power systems in accordance with an exemplary embodiment.

For the purposes of promoting an understanding of the principles of the present disclosure, reference will now be made to the embodiments illustrated in the drawings, and specific language will be used to describe the same. It should nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and/or a direct "connection".

In general, embodiments herein relate to an application of a method and/or system for an electromagnetic mechanical relay/contactor actuator design with a rotary actuation system to open and close the moveable electrical contact (or contacts). The rotary actuation system provides a flattened, non-cylindrical form factor compared to legacy configurations to optimize installation and integration of the relay contactor assembly into a plug in line replaceable module. In an embodiment, the module assembly would incorporate an actuation motor that is not linear but configured to impart a rotational motion to actuate an electrical contact assembly and provide actuation at the electrical contacts. The rotary actuator relay/contactor operates in a similar fashion to an axially constructed (linear actuated) contactor, except that the electromagnetic actuator in the rotary actuation system creates a rotary motion, and closes contacts arrayed at radial points circumferentially about the axis of rotation. In an embodiment, a partial turn e.g., ¼ turn or ½ turn rotary actuation and a linkage facilitates a change in the shape and direction of a motivation force that enables moving the moveable electrical contact and the overall configuration of the device.

Referring to FIG. 1, an aircraft 10 is shown. Aircraft 10 includes one or more control systems shown generally as 12. The control system 12 may include a power system 13 that interconnects with one or more controllers referred to generally as 16 and more specifically as 16*l*, 16*r* commonly located at or near each engine 14*l*, 14*r*. Other controllers 16 are also be depicted in this instance as 16*a*, 16*b*, and the like. In the described embodiments, the reference numerals are annotated with an "l" or "r" to denote the left or right side of the aircraft 10, respectively, for the purpose of simplicity of description. Likewise, the annotation "a", "b", . . . "n" is employed to simplify designation of a multiple enumeration of a component or element.

Each of the controllers 16 may be configured to receive various sensor signals from sensors referred to generally as 18 and individually as 18a, 18b, . . . 18n all over the aircraft 10 and may also operate one or more actuators shown generally as 20, and more specifically as 20a, 20b, 20c, . . . 20n to control the operation of the engines 14r, 14l, flight controls, (not shown), power systems 13 and the like. In one embodiment, the actuator 20 may be a contactor hereinafter referred to as contactor 20 employed for connecting power busses in the power system 13. The control system 12 and power system 13 may also be operably connected to various other components throughout the aircraft 10, including, but not limited to other controllers 16, control panels 23, displays 25, and the like. Some controllers 16 e.g., 16a may also be configured to receive power from various aircraft sources, e.g., generators, batteries and the like and distribute power as needed to various systems in the aircraft 10 The power system 13 may be part of a controller 16. In yet another embodiment, the configuration could be the opposite with the controller 16 operating as or providing a portion of the power system 13, as illustrated by the general depiction of 16a and described further herein. In an embodiment, the power system 13 incudes a contactor 20 with a rotary actuation system 100 as described herein for routing power to various components in the aircraft 10. In an embodiment, a contactor 20 may be a three-phase contactor 20 having at least three separate electrical switches or contacts configured to direct power associated with each phase of a three-phase power bus. In one embodiment, the contactor with rotary actuation system 100 may be part of a modular primary power distribution board such as described in U.S. Pat. No. 8,559,149, the entire contents of which are incorporated herein by reference.

Figure 2:
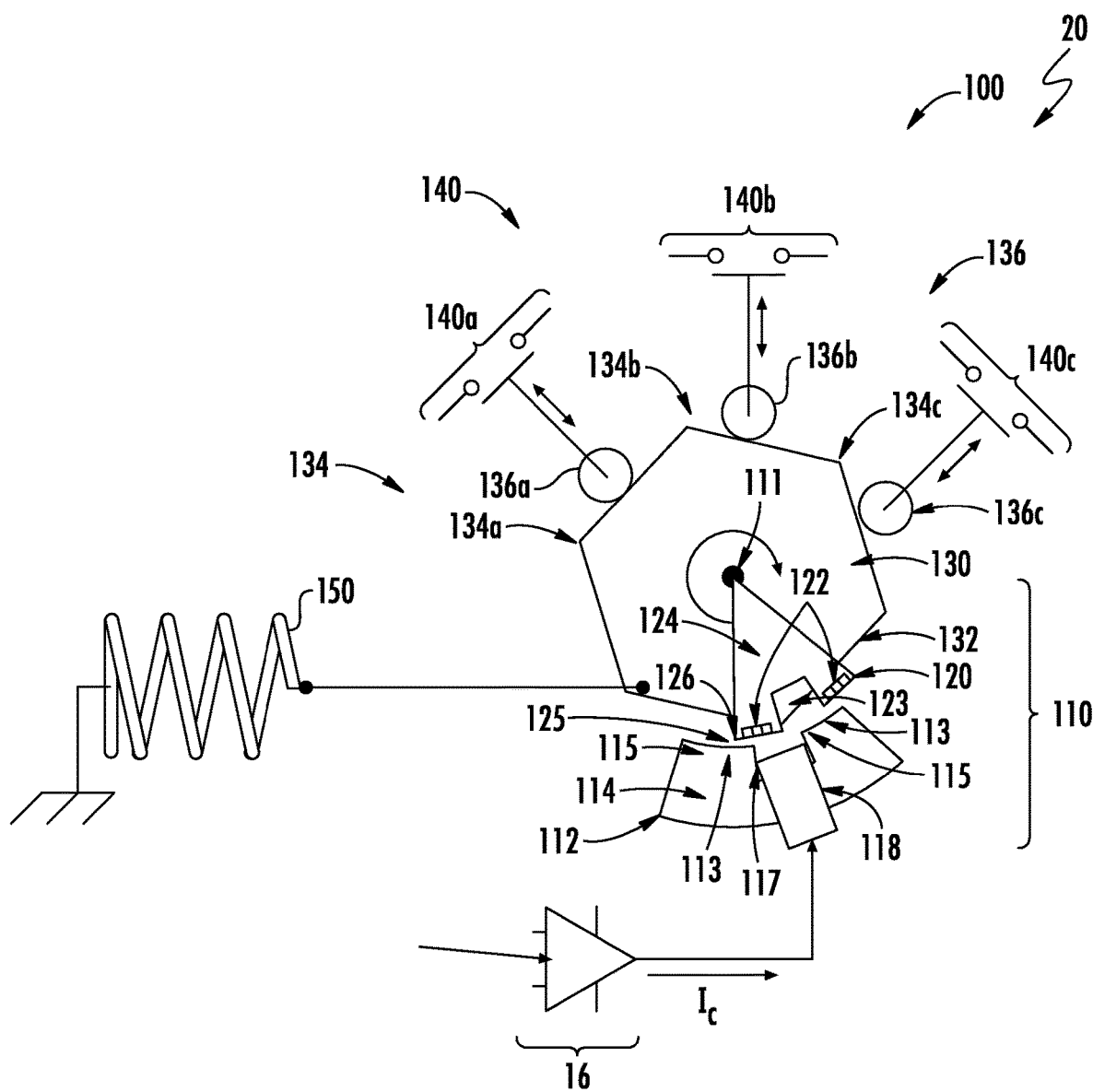
FIG. 2 depicts a simplified diagram of an embodiment of a contactor with rotary actuation system in accordance with an embodiment.

FIG. 2 depicts an example rotary actuation system 100 and contactor 20 in accordance with an embodiment as may be included in or connected to a controller 16 as part of the power system 13. The rotary actuation system 100 includes a rotary actuator 110 operably coupled to an actuation cam mechanism 130 pivotally fixed a center point of rotation 111 and a plurality of actuation lobes referred to generally as 134 and more specifically as 134a, 134b, and 134c distributed about a perimeter 132 of the cam 130. The rotary actuator 110 could be considered similar to a segment or section of a motor (e.g. a typical switched reluctance motor or a stepper motor) with a sector shaped rotor section 120 and a partially annular stator assembly 112. The rotary actuator 110 includes a fixed stator assembly 112 having a stator core 114 and an excitation coil 118. The rotary actuator 110 also includes a ferromagnetic rotor section 120 fixed to the cam 130 and pivotally attached to the point of rotation 111 such that the rotor section 120 is operable to rotate about the point of rotation 111 and thereby rotate the cam 130.

In an embodiment, stator assembly 112 is a single pole, typically of the single direct current (DC) type, partially circumscribes the rotor section 120. The stator assembly 112 has a plurality of ferromagnetic stator teeth 113 coupled to a partially annular ferromagnetic stator core 114, (two are depicted). A distal end 115 of each stator tooth 113 is proximate an outer annular periphery 126 of the rotor assembly 120. In one embodiment, a small outer air gap 125 exists between the outer annular periphery 126 and the stator teeth 113. The stator assembly 112 also has a stator coil 118 mounted in a slot 117 between the stator teeth 113. In an embodiment, the ferromagnetic stator core 112 and stator teeth 113 may be constructed of any variety of ferromagnetic materials including, but not limited to iron laminations, sintered magnetic powder material, or solid ferromagnetic material such as iron or steel. In one embodiment, steel laminations are employed. The stator winding 118, also called an armature winding, is typically a single DC winding. Though it could be an alternating current configuration as well.

Continuing with FIG. 2, the ferromagnetic rotor assembly 120 with at least one magnet 122 disposed in a ferromagnetic rotor core 124 at the outer periphery 126 thereof. In an embodiment, the magnet(s) 122 may be permanent magnets, however other types of magnets may be employed. There may be a portion of the ferromagnetic core 124 removed forming a slot 123. The rotor assembly 120 may be constructed of any variety of ferromagnetic materials including, but not limited to iron or steel laminations, sintered magnetic powder material, or solid ferromagnetic material such a steel. In one embodiment, steel laminations are employed. In another the rotor assembly 120 is machined from a steel block. While in the described embodiments the PMs 122 are arranged in the same orientation as the axis of the center of rotation 111 for the rotor assembly 120, PMs 122 can be also arranged at greater angle than zero degrees with respect the rotor center of rotation 111. Furthermore, while typically a generally rectangular cross section for the teeth 122 is employed, different cross sections other than rectangular are envisioned. The number of teeth is typically even to create pole pairs. The general operating principle is that the coil induces a magnetic flux in the stator core, and the flux crosses the air gap into the rotor. The magnetic core of the rotor has lower reluctance to the flow of magnetic flux than the air, and this generates a force that draws the rotor core into alignment with the stator core. Alternately, if permanent magnets are attached to the rotor core, the rotor core could be made from non-magnetic materials. The rotor could be a single PM, and the stator a single electromagnet.

Continuing with FIG. 2, the cam mechanism 130 is depicted as generally a polygon or circular in shape with lobes 134 arranged about its outer periphery 132 generally at the vertices. In an example, the cam 130 is depicted as a hexagon with three lobes 134a, 134b, and 134c are depicted at three of the vertices, though any number are possible depending on the configuration of the cam 130 and rotary actuation system 100. For example, a cam 130 with a greater number of lobes 134 could be employed, or multiple cams 130 could be employed. The cam 130 is generally depicted as a hexagon but other configurations are possible including other polygons, circle, and the like. In an embodiment, while the cam 130 is depicted as a hexagon, other configurations are envisioned and the configuration depicted is merely for illustration and simplicity for the purposes of describing the embodiments. It should also be appreciated that the profile of the lobes could be configured to provide for a latching function and/or hysteresis function such that once the peak of the profile is attained, any further motion causes the cam to fully rotate thereby latching to the rotated position. The rotary actuation system 100 also includes a cam follower shown generally as 136 and specifically as 136a, 136b, and 136c corresponding to the lobes 134a, 134b, and 134c respectively. The cam follower 136 is engaged with the surface of the cam 130 at the periphery 132 and configured to follow the surface as the cam 130 rotates. The cam follower 136 converts the rotary motion of the cam 130 to a linear displacement configured to actuate a switching device shown generally as 140 and specifically as 140a, 140b, and 140c respectively associated with the cam followers 136a, 136b, and 136c. In an embodiment a the switching device 140 is depicted as a simple single throw single pole switch, however other configurations are envisioned and the configuration depicted is merely for illustration and simplicity. For example, while in one embodiment three single pole switches are employed and configured to switch each phase of a three-phase power source, in other configurations, the switching device could be a single device with multiple poles such as might be employed to switch each phase of a multiphase power source.

In operation, controller 16 provides a control current $I_c$ the stator coil 118. When the coil 118 is fed with a current, a magnetic flux ($\Phi g$) is generated in the stator assembly 112, that then interacts magnetically with the ferromagnetic material of the rotor. When a control current $I_c$ is applied to the stator coil 118, the magnetic circuit formed between the teeth 113 of the stator assembly 112 and the rotor assembly 120 results in the flux crossing the airgap 125 to align the lines of magnetic flux. As a result, a force will be imparted on the rotor assembly, which will then rotate to align the rotor assembly 120, with the teeth 113 of the stator assembly 112. As a result, the cam 130 is rotated clockwise engaging the lobes 134 with the cam followers 136 in a manner such that the switching devices 140 are activated and providing continuity across the terminals of the switching devices 140 in the example as depicted. In an embodiment the application of the control current causes the cam to rotate a selected angular displacement e.g., approximately 20°-30° for the cam 130 shown. However, other angular displacements are possible. Moreover, depending on the configuration of the actuator 110, small angular step for each application of control current may be employed with successive/repeated applications incrementing the angular displacement to activate the switching devices. When a spring return 150 is operably connected to the cam 130 to ensure that the cam returns to its original position when the control current $I_c$ is removed. While the spring 150 is depicted as linear with an attachment near the periphery 132 of the cam 130, other configurations are possible. For example, a coiled torsion spring about the center of rotation 111 could also be employed for simplicity.

Figure 3:
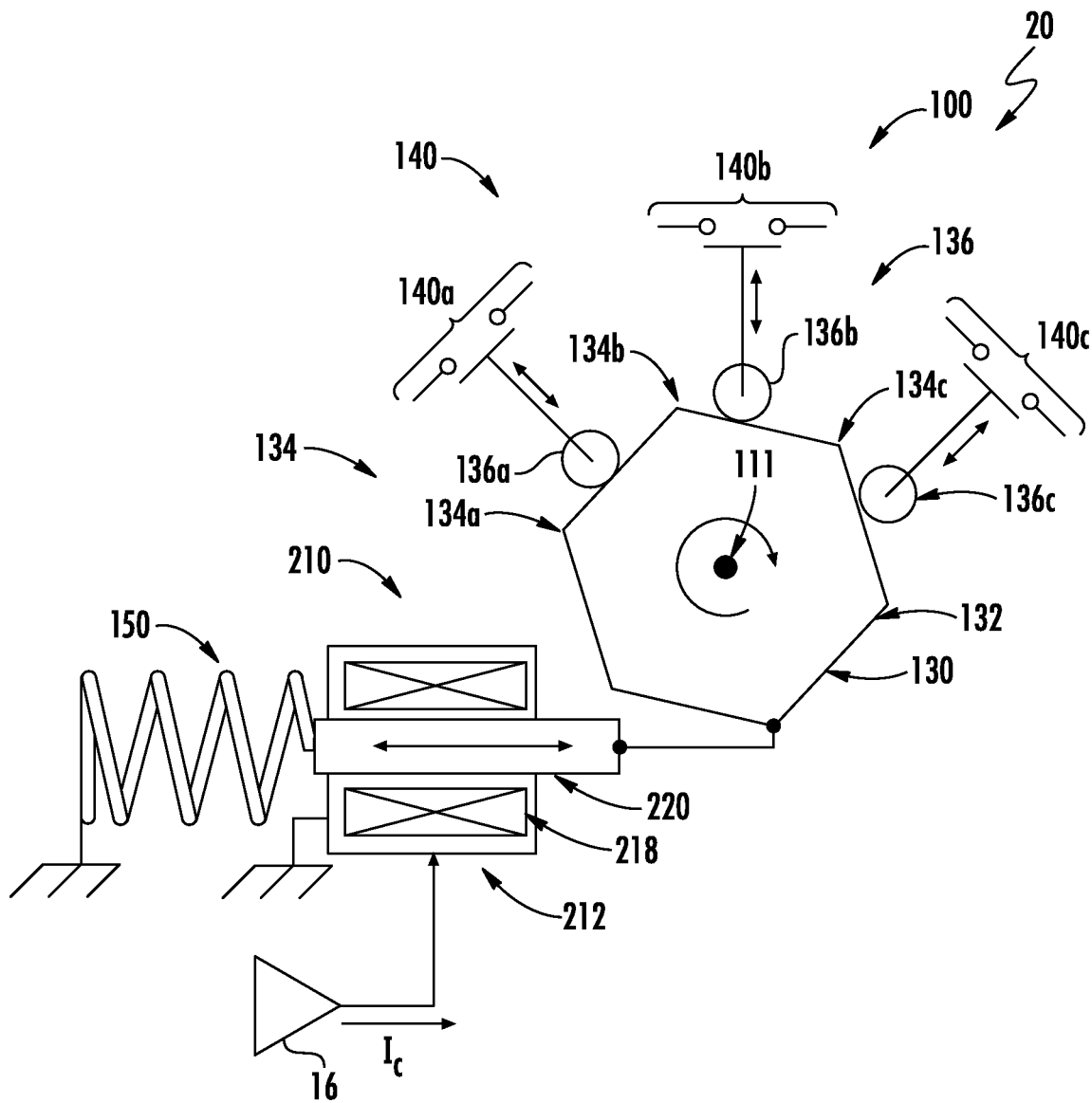
FIG. 3 depicts a simplified diagram of an embodiment of a contactor with rotary actuation system in accordance with an embodiment.

FIG. 3 depicts another possible embodiment and configuration for the rotary actuation system shown generally as 200. In this embodiment, the rotary actuation system 200 employs a linear electromechanical actuator 210 (e.g. relay or solenoid) comparable to the rotary actuator 110 of the previous embodiment. In this embodiment the electromechanical actuator 210 has a fixed stator/coil/armature assembly 212 with a coil 218 and a movable ferromagnetic piston 220 (comparable to the rotor assembly 120 above) operably connected to the cam 130 and the spring 150. The piston 220 is operably connected to the cam 130 such that actuation of the piston in a left-right direction as shown imparts a rotation to the cam 130 as needed so that the switching devices 140 are activated as described above.

In operation, for this embodiment once again controller 16 provides a control current Ic the stator coil 218. When the coil 118 is fed with a control current $I_c$, a magnetic flux ($\Phi g$) is generated in the stator assembly 112, that then interacts magnetically with the ferromagnetic piston 220. As a result, a force will be imparted on the piston 220 assembly, which will then compress the spring 150 and rotate the cam 130. Once again, the cam 130 is rotated clockwise engaging the lobes 134 with the cam followers 136 in a manner such that the switching devices 140 are activated and providing continuity across the terminals of the switching devices 140 in the example as depicted. When the control current $I_c$ is removed, the spring 150 returns the piston 220 and the cam 130 to its original position. Once again, while the spring 150 is depicted as linear with an attachment near the periphery 132 of the cam 130, other configurations are possible. For example, a coiled torsion spring could also be employed for simplicity.

It should be appreciated that the described embodiments present a unique design for a high current line replaceable unit configured contactor or switching device uniquely configured to be integrated with a circuit board or modular replaceable assemblies such as a modular or rack mounted type configuration power control unit. Advantageously, the rotary actuation enables configuration of a high current switching device in a flatter, modular form factor, thereby avoiding the large cylindrical form factor typical of high current devices (e.g., solenoids). For example the radial layout of the electrical contacts of the switching devices 140 results in a decreased depth of the contractor apparatus compared to conventional contactors and as a result facilitates installation of the rotary actuation system 100 as or in a line replaceable unit. This flatter actuator and modular approach allows the heat dissipation in the electric contacts (examples 140a, 140b, and 140c) to be sunk to the installation mounting frame, so that the electrical bus bar is not the primary heat sink for thermal losses due to contact voltage drop.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, element components, and/or groups thereof. For the purposes of this disclosure, it is further understood that the terms "inboard" and "outboard" can be used interchangeably, unless context dictates otherwise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A contactor with a rotary actuation system, the contactor with the rotary actuation system comprising:
   a plurality of switching devices configured to switch a plurality of electrical circuits;
   a plurality of cam followers each operably coupled to one of the plurality of switching devices, wherein each cam follower of the plurality of cam followers is configured to actuate a switching device of the plurality of switching devices;
   a cam mechanism, the cam mechanism pivotally attached to a point rotation, the cam having a perimeter and plurality of lobes about the perimeter, the cam in operable communication with each cam follower of the plurality of cam followers such that upon rotation of the cam mechanism, each cam follower engages a lobe of the plurality of lobes, it causes each cam follower to actuate the respective switching device of the plurality of switching devices;

an actuator in operable communication with the cam mechanism, the actuator responsive to a control current and operable to rotate the cam mechanism; and a controller, the controller in operably communication with the actuator, the controller operable to supply the control current the actuator.

2. The contactor with a rotary actuation system as recited in claim 1, wherein the plurality of switching devices includes at least one of a single pole and a multi-pole switch.

3. The contactor with a rotary actuation system as recited in claim 2, wherein the plurality of switching devices includes at least three switches, each switching device configured to switch a phase of three-phase power.

4. The contactor with a rotary actuation system as recited in claim 1, wherein the cam mechanism is a polygon wherein each vertex forms each the lobes of the plurality of lobes.

5. The contactor with a rotary actuation system as recited in claim 4, wherein the polygon has at least three vertices.

6. The contactor with a rotary actuation system as recited in claim 4, wherein the polygon is a hexagon.

7. The contactor with a rotary actuation system as recited in claim 1, wherein at least one lobe of the plurality of lobes includes a profile configured to cause latching or hysteresis of the rotation of the cam.

8. The contactor with a rotary actuation system as recited in claim 1, wherein the actuator is configured to rotate the cam mechanism a selected angular displacement.

9. The contactor with a rotary actuation system as recited in claim 1, wherein the actuator is a rotary actuator.

10. The contactor with a rotary actuation system as recited in claim 9, wherein the rotary actuator is configured has a ferromagnetic stator assembly and a ferromagnetic rotor assembly, the ferromagnetic stator assembly configured as an arcuate annular segment and the ferromagnetic rotor assembly configured as a sector, the ferromagnetic rotor assembly fixed to the cam mechanism.

11. The contactor with a rotary actuation system as recited in claim 10, wherein the ferromagnetic stator assembly includes a stator core having at least two stator teeth and a slot therebetween and a stator coil disposed in the slot.

12. The contactor with a rotary actuation system as recited in claim 10, wherein the ferromagnetic stator assembly includes a stator core having at least two stator teeth and a slot therebetween and a stator coil disposed in the slot.

13. The contactor with a rotary actuation system as recited in claim 10, wherein at least one of the ferromagnetic stator assembly and the ferromagnetic rotor assembly includes ferromagnetic materials including, but not limited to steel laminations, sintered magnetic powder material, or solid ferromagnetic material.

14. The contactor with a rotary actuation system as recited in claim 10, wherein the actuator is a linear actuator, the linear actuator having a second ferromagnetic stator assembly with a control coil and a piston operably connected to the cam mechanism and configured to rotate the cam mechanism when the linear actuator is activated.

15. The contactor with a rotary actuation system as recited in claim 14, wherein the linear actuator is a solenoid.

16. The contactor with a rotary actuation system as recited in claim 1, further including a return spring operably connected to at least one of the actuator or the cam mechanism, the return spring operable to return the cam mechanism to a first position corresponding to the plurality of switching devices being inactive.

17. The contactor with a rotary actuation system as recited in claim 1, wherein the contactor with a rotary actuation system is configured as a modular line replaceable wherein the plurality of switching devices are distributed at radial points about the perimeter of the cam resulting in a flatter form factor than existing linear contactors.

18. The contactor with a rotary actuation system as recited in claim 1, wherein the contactor with rotary actuation system is configured for a standard rack mount installation.

* * * * *